United States Patent [19]

Fremont et al.

[11] 3,845,287

[45] Oct. 29, 1974

[54] METHOD AND APPARATUS FOR CONTROLLING A MATERIAL TREATER

[75] Inventors: Robert Emil Fremont; Alfred Thomas Guertin; Charles Robert Fay; John William Stinson, all of Cincinnati, Ohio

[73] Assignee: Formica Corporation, Cincinnati, Ohio

[22] Filed: Feb. 26, 1974

[21] Appl. No.: 446,076

Related U.S. Application Data

[63] Continuation-in-part of Ser. No. 357,134, May 4, 1973.

[52] U.S. Cl..................... 235/151.1, 34/16, 432/36
[51] Int. Cl............................................... G06g 7/58

[58] Field of Search............ 162/DIG. 6; 235/151.1, 235/151.12; 432/36; 34/16; 117/66, 119.6

[56] References Cited
UNITED STATES PATENTS
3,596,071   7/1971   Doering ........................... 235/151.1

*Primary Examiner*—Eugene G. Botz
*Attorney, Agent, or Firm*—Frank M. Van Riet

[57] ABSTRACT

An improved process and apparatus are disclosed wherein the temperature of a material treater drying zone is controlled via a correlation between the temperature of the finished product and the line speed of the material being treated through the treater.

10 Claims, 4 Drawing Figures

$LSn < SPEC.$   $LIMIT = RAISE\ TEMPERATURE$ $LSn = SPEC.$   $LIMIT = DO\ NOT\ CHANGE\ TEMPERATURE\ SET\ POINT$ $T_W > T_{WUL} = LOWER\ DRYER\ TEMPERATURE$ $T_W \leq T_{WUL} = OBEY\ (14)$

METHOD AND APPARATUS FOR CONTROLLING A MATERIAL TREATER

CROSS-REFERENCE TO RELATED APPLICATIONS

This application is a continuation-in-part of our co-pending application, Ser. No. 357,134 filed May 4, 1973 and entitled METHOD AND APPARATUS FOR CONTROLLING A MATERIAL TREATER.

BACKGROUND OF THE INVENTION

The use of control apparatus in processes for the production of treated materials has become more and more widespread in recent years. The high cost of labor, the increased incidence of decreased quality and the need for more uniformity in products have been the prime motivating forces behind the switch over.

In the treating of materials, e.g. the coating, impregnation etc. and drying of materials such as paper, cloth etc., it has especially become increasingly desirable to utilize a fully automatic process and U.S. Pat. No. 3,596,071 is directed to a system which approaches such a realization. This patent, which is hereby incorporated herein by reference, discloses and claims a method and apparatus for the control of a coater and dryer wherein variables such as moisture content, resin solids concentration, percent resin and percent volatiles are measured and/or computed according to various mathematical formulae. The computed values are then used to control the rate of resins application and the drying rate of the impregnated material. The controls effected by the patentee are varied by the use of analog computers and are not capable of optimizing line speed, with the constraints of maximum web temperature and maximum specification line speed.

SUMMARY

We have not discovered a new and novel improvement which overcomes the difficulties exhibited by the prior art control procedures and apparatus in the treatment of material webs. Our invention permits the maximum possible line speed to be obtained for a given material treated, while maintaining the desired drying level and preventing the desired maximum web temperature from being exceeded. Thus, product quality and uniformity is assured at the lowest possible unit cost. Furthermore, excessive computer core storage is not required due to the simplicity of the algorithms.

We attain these advantageous results by the use of a computer which executes the logic required to optimize the treater line speed, by changing dryer temperatures.

Our method is a novel method for line speed control optimization of the drying of a material treater, with web temperature as a constraint. Only very simple computer logic is required to implement the controls. The invention employs a combination of feed forward and feed back means to obtain the maximum permissible material treater line speed, operating under the constraints of a maximum mechanical line speed and a maximum stacking or web temperature.

DESCRIPTION OF THE INVENTION INCLUDING PREFERRED EMBODIMENTS

Figure 1:
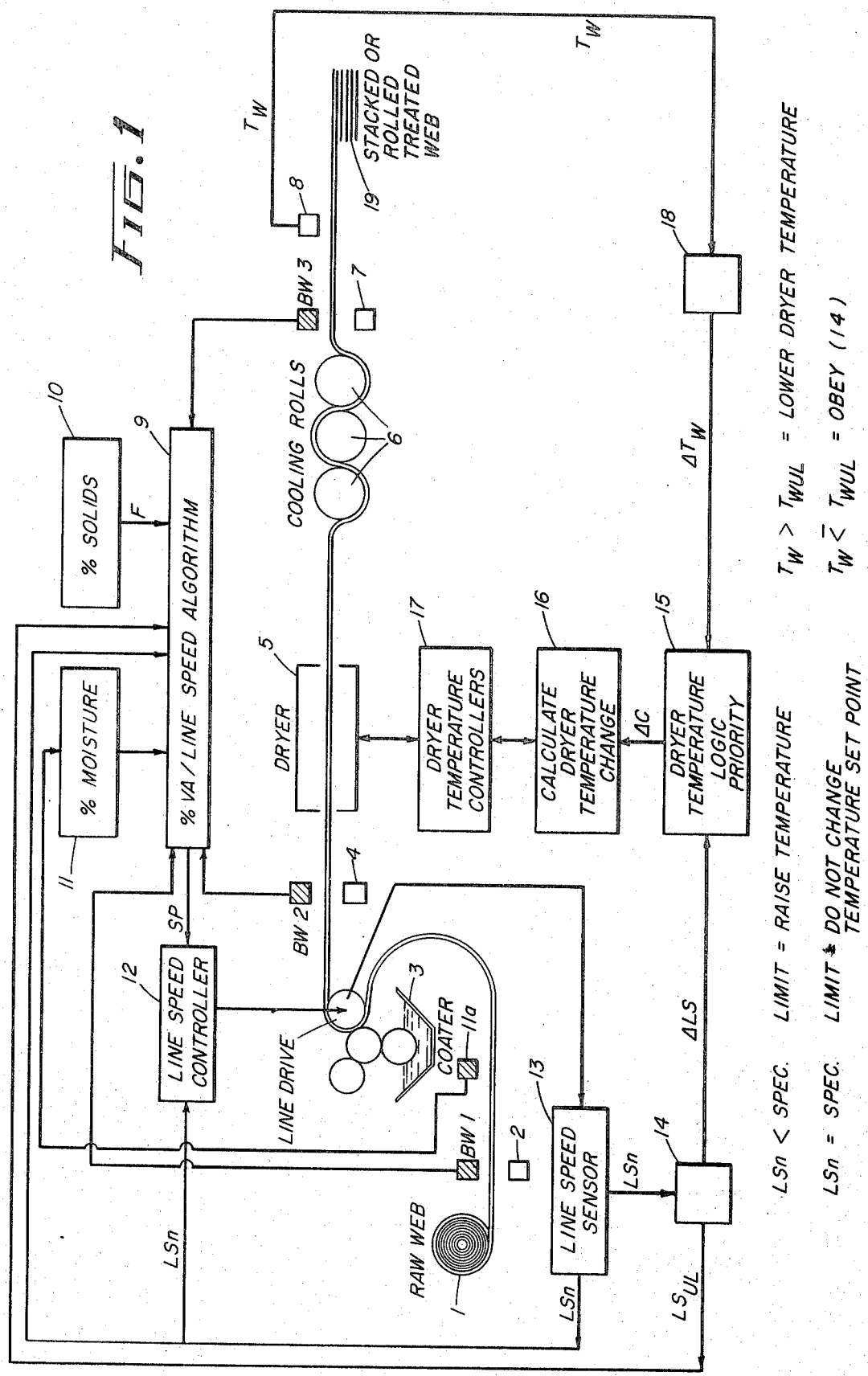
FIG. 1 is a diagrammatic view of a drying process for a material treater useful in explaining the operation of the line speed control optimization of the present invention.

With reference to the drawings, specifically FIG. 1, a material treating process is shown wherein a raw web 1, advantageously employed as a roll, is passed through a coater 3 where the material to be applied thereto is deposited thereon. The coater may apply the material to one or both sides of the web and the material applied may merely coat the web or, alternatively, may be absorbed thereby to produce an impregnated product. The so-treated web then passes through a dryer 5 where the volatiles are driven off and the deposited or impregnated material is dried. The web passes through the dryer and is cut and stacked or rolled as shown at 19.

In order to more particularly describe our invention, we will illustrate its feasibility with reference to the impregnation of a web with a volatile solution of a resinous material such as a phenolic resin or a melamine/formaldehyde resin.

To best understand the invention, a brief definition of various terms used hereinafter is believed useful. The term "BW1" refers to the basis weight of the web being passed into the coater and constitutes its total weight, i.e. dry fiber weight plus any moisture weight therein. The term "BW2" refers to the basis weight of the impregnated web and also constitutes its total weight i.e., dry fiber weight, moisture weight, impregnated resin weight plus the weight of the volatiles added from the resin solution. The term "BW3" refers to the basis weight of the dried, impregnated web and also constitutes its total weight, i.e. dry fiber weight, moisture weight, dried resin weight and volatile weight. It can be readily appreciated that from these measured weights, the weights, and therefore, the amounts, of various consituents of the resin solution added and web per se can be calculated. These measurements and their relationship to one another are thoroughly discussed in the above-mentioned U.S. Patent.

Again with reference to FIG. 1, the web 1, i.e. paper, glass, metal etc., passes through gauge 2 wherein the web basis weight BW1 is measured. The resin is then applied to the web by coater 3, and gauge 4 measures the raw web and the resin solids and the resin solvents (volatiles) basis weight, BW2. The impregnated web continues through dryer 5 wherein the web is dried to the desired percent volatiles, calculated as described below. Cooling rolls (6) cool the dried, impregnated web to the desired level to prevent exotherm and/or blocking in the stack or roll 19 of treated material. Gauge 7 measures the treated web basis weight BW3 and a device 8 measures the web temperature, $T_W$, after the cooling rolls and directly before the web is rolled or cut and stacked. Device 8 can be any temperature measuring device such as an infrared pyrometer. Device 8 then sends a signal indicating the web temperature to box 18.

As mentioned above, the drying of the web is controlled by line speed adjustments to maintain the desired percent volatiles, $\% V_A$, where $$\% V_A = BW3 - [BW1(1 - m/100) + (BW2 - BW1)F] \times 100/BW1(1 - \% M/100)$$

wherein $\% M$ = moisture content of the raw web
$F$ = resin solids fraction.

The $\% M$ is either a known factor or can be measured during the process by moisture gauge 11a, positioned before coater 3 such as described in U.S. Pat. No. 3,596,071. Gauges 2, 4 and 7 are well known and may constitute so-called "Beta" gauges, also as described in the above-mentioned patent. They, as well as device 8 and moisture gauge 11a, may be located at a fixed point across the web and adjacent thereto or adapted to scan or traverse back and forth across the web.

Cooling rolls 6 are not critical and they may be omitted entirely or replaced with analogous, equivalent means for cooling the web.

Outputs or instrument responses from gauges 2, 4 and 7 are transmitted to $\% V_A$/line speed algorithm 9 where they are used to calculate $\% V_A$ in conjunction with the moisture percentage indication, $\% M$, percent resin solids concentration indication, F, the present line speed, LSn, and the upper line speed limit, $LS_{UL}$, which are known or measured and provided from 11, 10, 13 and 14, respectively, according to the above formula. The $\% V_A$/line speed control algorithm 9 increases or decreases the treater line speed to maintain the desired $\% V_A$. The output error signal from 9, i.e. line speed set point, SP, is the input signal to the line speed controller 12 which is connected to and controls the line drive roller of coater 3. Controller 12 is a standard digital or analog computer which determines the deviation between the set point and the actual line speed LSn by comparison. The line speed set by controller 12 is converted to a digital output by line speed sensor 13. The sensor signal indicates the current line speed LSn of the web which signal is then sent to computer box 14 and also back to controller 12. Sensor 13 also transmits current line speed LSn, to algorithm 9. Box 14 calculates $\Delta LS$ and transmits the upper line speed limit, $LS_{UL}$, to algorithm 9 and box 18 calculates $\Delta T_W$, as more fully described below. If the line speed is less than the limit, the dryer temperature is raised if the web temperature $T_W$ is less than the maximum desired web temperature, $TW_{UL}$, as determined in logic box 15. If the line speed equals the specification limit, the dryer temperature is not changed. Computer logic box 15 determines whether the web temperature is more than that desired, in which case the oven temperature is lowered, or whether the web temperature is equal to the desired value, in which case no dryer temperature changes are made. Logic box 15 determines, from the signals emitted from boxes 14 and 18, the priorities of control between the two signals. The signal of box 18 has priority over the signal of box 14. Once box 15 establishes the need for a dryer temperature change, the required change is calculated by computer 16, according to a predetermined function, e.g.

$$T_{An} = K_L \cdot K_T \cdot \Delta LS + T_{An-1}$$

or $$T_{An} = K_T \cdot K_W \cdot \Delta T_W + T_{An-1},$$

relating the dryer temperature set points, $T_{An}$, at the present time, n, line speed variation, $\Delta LS$, or the web temperature variation, $\Delta TW$, and the dryer temperature at time $n - 1$, i.e., $T_{An-1}$; $K_L$, $K_T$ and $K_W$ being constants obtained by tuning the apparatus, as discussed hereinbelow. The function can be different for a temperature increase and for a temperature decrease. The function may be a simple equation fitted to experimental data or a proportional change, such as a 5°F. temperature change for every 10 feet/minute line speed change necessary. The calculated dryer temperature change from 16 is sent via an output signal to dryer temperature controller 17 which, in turn, controls the temperature of the dryer and transmits signal $T_{An-1}$, indicative of the dryer temperature at the previous time increment, $n - 1$, as mentioned above, back to 16. As the temperature of the dryer changes, the $\% V_A$/line speed algorithm 9 changes the line speed of the web, to maintain the given $\% V_A$ target. The changes in line speed affect the web cooling, since decreasing line speed increases web dwell time on the cooling rolls 6.

Logic boxes 15 and 16 can be any known logic device such as a digital computer, an analog computer, a function generator, a mechanical controller or the like. Controller 17 can be any type of standard temperature control device i.e. a proportional control which closes while cooling or heating etc. or an open or close circuit which functions to open or close a steam valve etc.

Figure 2:
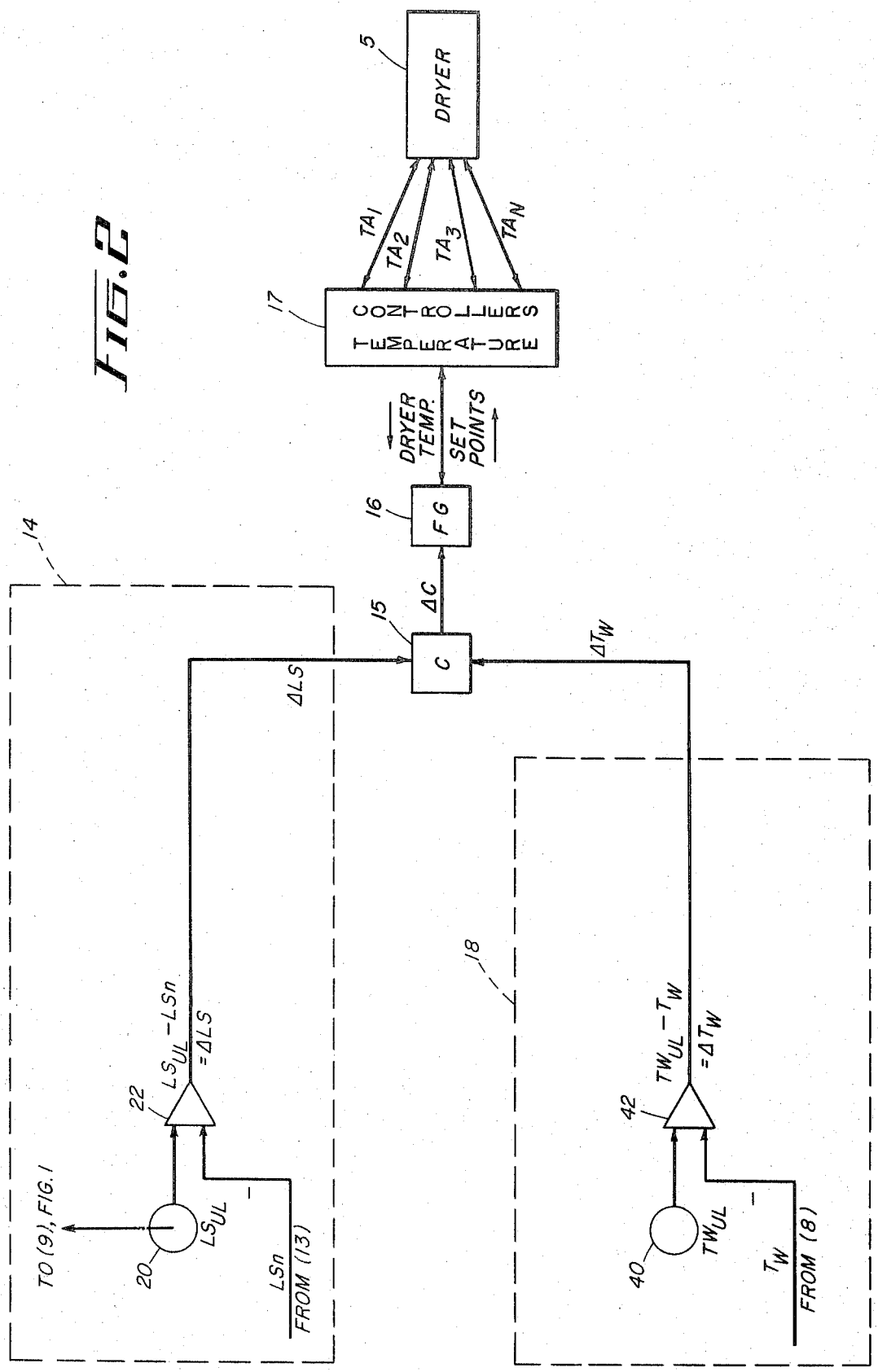
FIG. 2 is an analog computer diagram representative of the type which may be utilized in connection with the present invention.

To accomplish the computations and controls of the instant invention, there is provided an analog computer diagram, FIG. 2. In the schematic, in computer box 14, FIG. 1, the maximum line speed limit $LS_{UL}$ is set in potentiometer 20. Amplifier 22 subtracts line speed, LSn, as transmitted from 13, from $LS_{UL}$. The difference, $\Delta LS$, is an input to logic priority box 15 which may constitute comparators and/or relays.

The maximum web temperature, $TW_{UL}$, is set, in computer box 18, FIG. 1, in potentiometer 40. Amplifier 42, subtracts the web temperature, $T_W$, from $TW_{UL}$ utilizing the signal from gauge 8. The difference, $\Delta T_W$, is an input to logic box 15.

Figure 3:
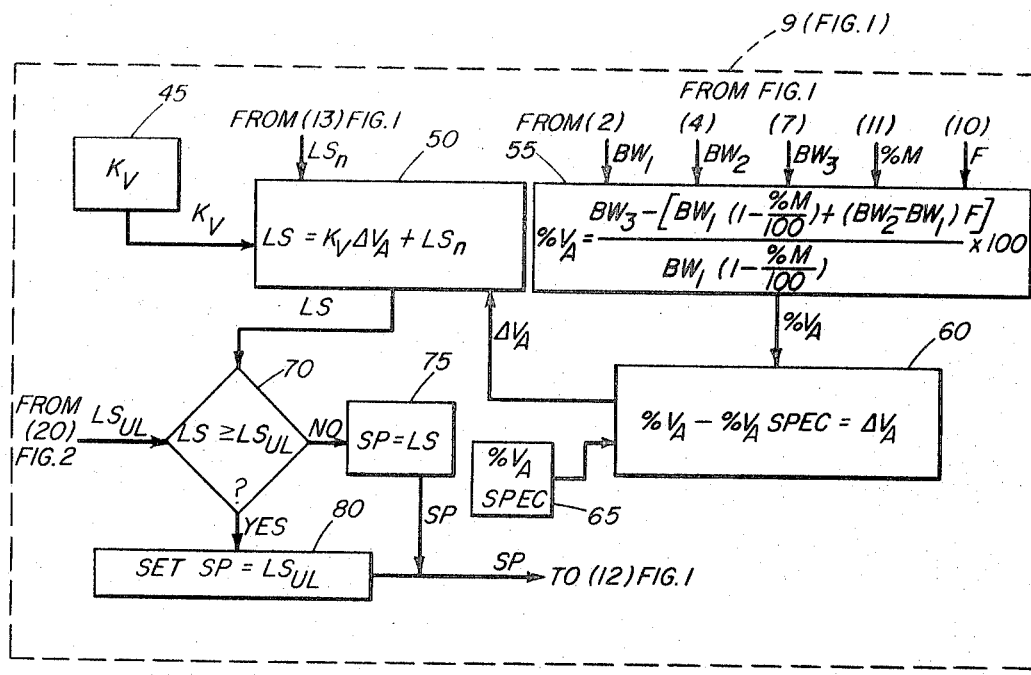
FIG. 3 is a flow diagram of the calculations and equipment adjustment signals which are derived in the % $V_A$/line speed algorithm 9 of FIG. 1.
Figure 4:
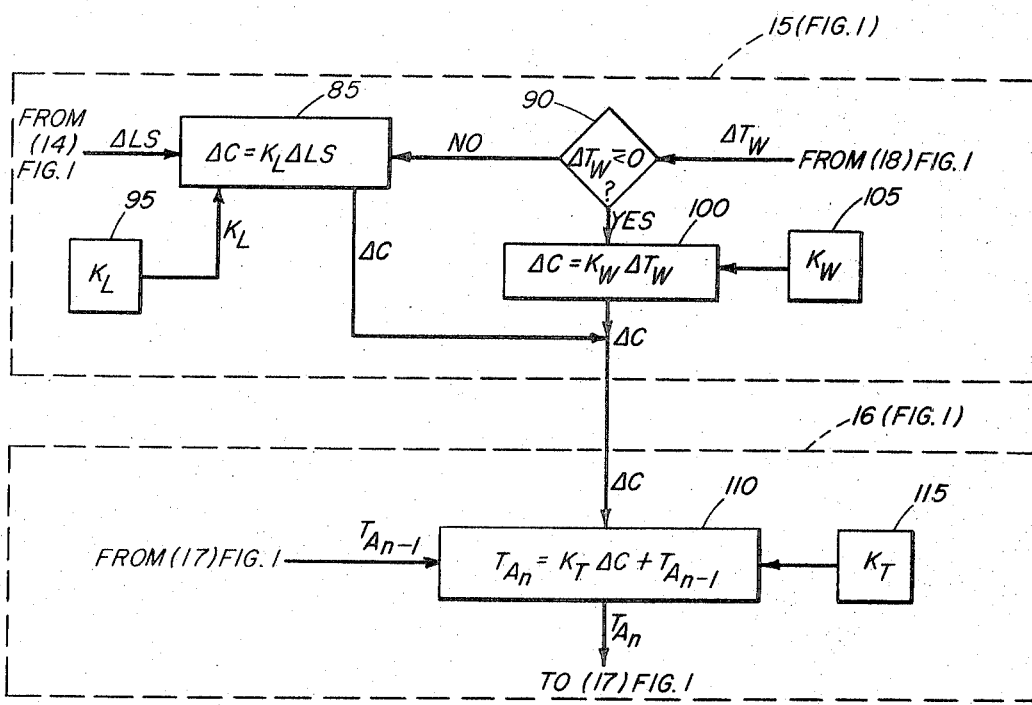
FIG. 4 is a flow diagram of the calculations and equipment adjustment signals which are derived in the logic box 15 and computer 16 of FIG. 1.

FIGS. 3 and 4 are provided as typical, although not all inclusive, flow diagrams in order to more precisely describe the functions of $\% V_A$/line speed algorithm 9, dryer temperature logic priority box 15 and calculator i.e. logic box 16. With reference to FIG. 3, $\% V_A$ is calculated from $BW_1$, $BW_2$, $BW_3$, $\% M$ and F, from 2, 4, 7, 11 and 10 of FIG. 1, respectively, in block 55. The value calculated for $\% V_A$ is transmitted to block 60 wherein $\Delta V_A$ is calculated using the $\% V_A$ specification received from block 65. $\Delta V_A$, in conjunction with $K_V$, a constant dependent upon dryer 5 airflow/temperature interreactions, from block 45 and LSn (from 13, FIG. 1) are then used in block 50 to calculate the line speed LS which is needed to obtain the $\% V_A$ specification according to the equation:

$$LS = K_V \Delta V_A + LSn$$

From block 50, LS, line speed, is sent to logic block 70 which also receives $LS_{UL}$ from 20, FIG. 2. Block 70 relates $LS_{UL}$ to LS in order to determine the proper line speed set point, SP, for controller 12. If LS is greater than or equal to $LS_{UL}$, the SP is set to equal $LS_{UL}$ in block 80. If LS is less than $LS_{UL}$, the SP is set equal to LS in block 75.

FIG. 4 explains and expands boxes 15 and 16 of FIG. 1. In box 15, $\Delta T_W$ from 18, FIG. 1, is an input to block 90. If $\Delta T_W$ is less than or equal to zero, the calculations set forth in box 100 are performed. If $\Delta T_W$ is greater than zero, the calculations depicted in box 85 are performed.

In box 100, the calculations which are performed, if the need is indicated, are as follows:

$$\Delta C = K_W \cdot \Delta T_W$$

where $\Delta T_W$ is as defined above, $\Delta C$ is the dryer factor necessary to make the proper dryer adjustments and $K_W$ is a constant, depending on the web cooling capacity of the particular material treater, relating web temperature changes to dryer temperature changes, and is plugged in via block 105.

In box 85, the following calculations are performed if logic block 90 indicates the need, $\Delta LS$ being from 14, FIG. 1.

$$\Delta C = K_L \cdot \Delta LS$$

where $\Delta C$ and $\Delta LS$ are as described above and $K_L$ is a constant depending on the web cooling capacity of the particular material treater, relating line speed changes to dryer temperatures, and is added via block 95.

The dryer factor, $\Delta C$, is passed from 15 to computer 16, e.g. a function generator. The new dryer air temperature set points, $T_{An}$, which may or may not be needed, are calculated in block 110. $T_{A1}, T_{A2}, T_{A3} \ldots T_{AN}$ represent the temperatures in dryer 5 at zones 1, 2, 3 ... N etc. therein, the specific number of zones being inconsequential.

The equation used in block 110 is as follows, $T_{An-1}$ being received from 17, FIG. 1:

$$T_{An} = K_T \cdot \Delta C + T_{An-1}$$

where $T_{An}$, $T_{An-1}$ and $\Delta C$ are as defined above and $K_T$ is a constant, depending on the particular dryer/cooling configuration of the particular system, received from block 115.

The $T_{An}$ from block 110 is the input to dryer temperature controller 17, described above. All the above enumerated constants, i.e. $K_T$, $K_V$, $K_W$ and $K_L$ can be determined experimentally using simple methods or by processes of model testing and iteration schemes, as are known in the art, see, for example, U.S. Pat. Nos. 3,543,010; 3,534,400; 3,532,862. The equations or mathematical models set forth in 50, 85, 100 and 110 of FIGS. 3 and 4 are examples only and can range from these relatively simple representations to very complex systems formed by fitting experimental data to the models.

Computer 16 controls the line speed of the treater in the following manner. If the dryer temperatures are lowered in block 16, the % $V_A$ increases, which, by the % $V_A$/line speed algorithm 9, decreases the line speed to allow % $V_A$, actual, to equal or approach % $V_A$, specification value. Likewise, if the dryer temperature is raised in computer 16, % $V_A$ decreases, which, by the % $V_A$/line speed algorithm 9, increases the line speed so that % $V_A$, actual, again equals or approaches % $V_A$, specification value.

Many other analog circuits, components and other devices consisting of mechanical, electronic, pneumatic and/or hydraulic devices can be used in our invention.

We claim:

1. A method of controlling a fibrous material treating process including a coater for impregnating a host material with a resin-bearing volatile solution and a dryer for drying said material comprising
   1. measuring the weight of the host material before impregnation,
   2. measuring the weight of the impregnated material before drying,
   3. measuring the weight of the dried, impregnated material,
   4. providing the percent resin solids concentration of said solution, the moisture content of said host material before impregnation and a desired percent volatiles concentration of the dried impregnated sheet,
   5. computing the amount of volatiles present in said dried material, and
   6. controlling the line drive of the coater in accordance with the resultant computed volatile percentage to produce said desired percent volatiles concentration,
   7. measuring the temperature of the dried, impregnated material,
   8. measuring the line speed of the host material through the coater,
   9. determining the variance from or the compliance of said line speed and said temperature of the dried, impregnated material with predetermined specified limits of line speed and temperature, respectively,
   10. determining a need for a temperature change in said dryer from said variance or compliance determinations,
   11. computing the required temperature change in accordance with a predetermined function and
   12. controlling the temperature of said dryer in accordance with the computed change required.

2. A method of controlling the drying of a fibrous host material impregnated by a resin-bearing solution comprising
   1. measuring the host material before impregnation thereof to produce a first instrument response indicative of the weight thereof,
   2. measuring the impregnated material before drying to produce a second instrument response indicative of the total weight thereof,
   3. providing an indication of the percent resin solids concentration of said solution, the moisture content of said host material before impregnation and a desired percent volatiles concentration of the dried, impregnated sheet,
   4. measuring the impregnated sheet after drying to produce a third instrument response indicative of the weight thereof,
   5. mathematically combining the first response, the second response, the percent resin solids concentration indication, the moisture content indication and the third response to produce a computer output error indicative of the percent volatiles in the impregnated, dried material,
   6. controlling the line drive of the impregnator in accord with said output error to produce said desired percent volatiles concentration, 7. sensing the line speed of the material through the impregnator,
8. measuring the temperature of the dried, impregnated material downstream of said third instrument response to produce a fourth instrument response indicative of the temperature thereof,
9. computing whether the line speed is below, equal to or above a specified limit to provide a first signal indicative of the conformity or non-conformity of the actual line speed to the specified line speed limit,
10. computing whether the temperature of the dried, impregnated sheet is above, equal to or below a specified limit to provide a second signal indicative of the conformity or non-conformity of the actual temperature to the specified temperature limit,
11. determining the priority of said first and second signals in accordance with a predetermined priority schedule to provide a third signal indicative of the need for a temperature change in said dryer,
12. computing the required temperature change in response to said third signal in accordance with a predetermined function to provide an output signal representative of the required temperature change and
13. controlling the temperature of the dryer in accordance with said output signal.

3. In a sheet treating process wherein a sheet is impregnated by a resin solution in a coater and dried in a heating unit, apparatus for controlling the drying of said impregnated sheet comprising
   1. first gauge means adjacent to said sheet so as to provide a measurement of the weight of said sheet,
   2. second gauge means mounted before said heating unit and adjacent to said impregnated sheet so as to provide a measurement of the weight thereof,
   3. a third gauge means mounted after said heating unit and adjacent to said dried impregnated sheet so as to provide a measurement of the weight thereof,
   4. means responsive to said first, second and third gauge means for providing a computed measurement of the percent volatiles concentration in said dried, impregnated sheet, so as to provide an output error signal,
   5. first controlling means responsive to said output error signal for controlling the line speed of said sheet through said coater,
   6. a fourth gauge means mounted after said heating unit and adjacent to said dried, impregnated sheet so as to provide a measurement of the temperature thereof,
   7. line speed detection means to measure the line speed of said sheet through said coater, and
   8. second controlling means responsive to said line speed measurement and said dried, impregnated sheet measurement for controlling the rate of drying of said impregnated sheet in said heating unit.

4. Apparatus according to claim 3 comprising a fifth gauge means mounted before said coater and adjacent to said sheet so as to provide a measurement of the average moisture content thereof.

5. Apparatus according to claim 3 comprising cooling means positioned after said dryer and before said fourth gauge means to cool said dried, impregnated sheet.

6. Apparatus according to claim 3 wherein said second controlling means comprises
   9. sensor means for determining the actual line speed of the sheet through the coater,
   10. means for computing whether said actual line speed is below, equal to or above a specified limit to provide a first signal indicative of the conformity or non-conformity of said actual line speed to the specified line speed,
   11. means for computing whether the temperature of the dried, impregnated sheet is above, equal to or below a specified limit to provide a second signal indicative of the conformity or non-conformity of the actual temperature to the specified limit,
   12. means responsive to said first and second signals for determining the priority thereof in accordance with a predetermined priority schedule to provide a third signal indicative of the need for a temperature change in said dryer,
   13. means responsive to said third signal for computing the required temperature change in accordance with a predetermined function to provide an output signal representative of the required temperature change and
   14. means for controlling the temperature of the dryer in accordance with said output signal.

7. Apparatus according to claim 6 comprising a fifth gauge means mounted before said coater and adjacent to said sheet so as to provide a measurement of the average moisture content thereof.

8. Apparatus according to claim 6 comprising cooling means positioned after said dryer and before said fourth gauge means to cool said dried, impregnated sheet.

9. Apparatus according to claim 6 wherein said fifst, second, third and fourth gauge means are scanning gauges.

10. A method according to claim 1 wherein the dried impregnated material is cooled before the temperature thereof is measured.

* * * * *